US012752476B2

(12) United States Patent
Boydston et al.

(10) Patent No.: US 12,752,476 B2
(45) Date of Patent: Oct. 6, 2026

(54) ADDITIVE MANUFACTURING VIA PROTEIN DENATURATION

(71) Applicant: Wisconsin Alumni Research Foundation, Madison, WI (US)

(72) Inventors: Andrew Jackson Boydston, Middleton, WI (US); Chang-Uk Lee, Verona, WI (US); Audrey Girard, Stoughton, WI (US); Jacob M. Perre, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 73 days.

(21) Appl. No.: 18/817,708

(22) Filed: Aug. 28, 2024

(65) Prior Publication Data

US 2025/0073984 A1 Mar. 6, 2025

Related U.S. Application Data

(60) Provisional application No. 63/579,322, filed on Aug. 29, 2023.

(51) Int. Cl.
*B29C 64/106* (2017.01)
*B33Y 10/00* (2015.01)
*B33Y 70/00* (2020.01)

(52) U.S. Cl.
CPC ........ *B29C 64/106* (2017.08); *B29K 2089/00* (2013.01); *B33Y 10/00* (2014.12); *B33Y 70/00* (2014.12)

(58) Field of Classification Search
None
See application file for complete search history.

(56) References Cited

U.S. PATENT DOCUMENTS 6,514,518 B2 * 2/2003 Monkhouse ......... A61K 9/1694 424/428
11,597,145 B2 3/2023 Boydston et al.
(Continued)

FOREIGN PATENT DOCUMENTS

WO 2022140333 A1 6/2022

OTHER PUBLICATIONS

Phuhongsung, et al., "4D printing of products based on soy protein isolate via microwave heating for flavor development," Food Research International, Aug. 12, 2020, 10 pages, vol. 137, https://doi.org/10.1016/j.foodres.2020.109605.
(Continued)

*Primary Examiner* — Xiao S Zhao
*Assistant Examiner* — Nicholas J Chidiac
(74) *Attorney, Agent, or Firm* — Bell & Manning, LLC

(57) ABSTRACT

Methods for additive manufacturing of an object are provided which comprise providing a build solution comprising proteins and a solvent in an additive manufacturing system; generating heat in the build solution to denature proteins; and aggregating denatured proteins to form a solidified region of an object, the solidified region comprising denatured, aggregated proteins. The heat may be generated in a localized area of the build solution to denature proteins in the localized area, wherein the localized area is in contact with unheated build solution and the solidified region may be formed in the localized area of the build solution.

15 Claims, 12 Drawing Sheets

(56) References Cited

U.S. PATENT DOCUMENTS

| | | | | |
|---|---|---|---|---|
| 2002/0018816 | A1* | 2/2002 | Monkhouse | B33Y 70/00 424/489 |
| 2022/0306877 | A1 | 9/2022 | Nelson et al. | |
| 2023/0174725 | A1* | 6/2023 | Nelson | C08J 3/245 522/26 |
| 2023/0255253 | A1* | 8/2023 | Levin | A23P 20/15 426/231 |
| 2023/0286870 | A1* | 9/2023 | Sigmund | B22F 10/66 |
| 2024/0130395 | A1* | 4/2024 | Chen | C07K 1/12 |
| 2024/0225040 | A9* | 7/2024 | Chen | C07K 1/12 |
| 2025/0162036 | A1* | 5/2025 | Cordero | B22F 10/64 |

OTHER PUBLICATIONS

Chen, et al., "Plant protein-based fibers: Fabrication, characterization, and potential food applications," Critical Reviews in Food Science and Nutrition, Dec. 14, 2021, 26 pages, https://doi.org/10.1080/10408398.2021.2004991.

Blutinger, et al., "The future of software-controlled cooking," npj Science of Food, 2023, 6 pages, vol. 7, No. 6, https://doi.org/10.1038/s41538-023-00182.

Álvarez-Castillo, et al., "Protein-Based Bioplastics from Biowastes: Sources, Processing, Properties and Applications," Bioplastics for Sustainable Development, 2021, pp. 137-176, https://doi.org/10.1007/978-981-16-1823-9_5.

Smith, et al., "Additive Manufacturing of Bovine Serum Albumin-Based Hydrogels and Bioplastics," Biomacromolecules, Nov. 12, 2019, pp. 484-492, vol. 21, doi: 10.1021/acs.biomac.9b01236.

Gauvin, et al., "Microfabrication of complex porous tissue engineering scaffolds using 3D projection stereolithography," Biomaterials, Feb. 25, 2012, pp. 3824-3834, vol. 33, doi:10.1016/j.biomaterials.2012.01.048.

Smith, et al., "Methacrylated Bovine Serum Albumin and Tannic Acid Composite Materials for Three-Dimensional Printing Tough and Mechanically Functional Parts ," Applied Materials & Interfaces, Apr. 26, 2022, pp. 21418-21425, vol. 14, https://doi.org/10.1021/acsami.2c01446.

Kim, et al., "Precisely printable and biocompatible silk fibroin bioink for digital light processing 3D printing," Nature Communications, 2018, 14 pages, vol. 9, doi: 10.1038/s41467-018-03759-y.

* cited by examiner

| Concentration of BSA resin solution (wt%) | layer thickness (μm) |
|---|---|
| 25 | 130 ± 24 |
| 30 | 161 ± 23 |
| 35 | 285 ± 28 |

ADDITIVE MANUFACTURING VIA PROTEIN DENATURATION

CROSS REFERENCE TO RELATED APPLICATIONS

The present application claims priority to U.S. Provisional Patent Application No. 63/579,322, filed Aug. 29, 2023, the entire contents of which are incorporated herein by reference.

REFERENCE TO GOVERNMENT RIGHTS

This invention was made with government support under W911NF-17-1-0595 and W911NF-20-2-0182 awarded by the ARMY/ARO. The government has certain rights in the invention.

BACKGROUND

Plastic parts may be fabricated using additive manufacturing (AM) techniques, also known as three-dimensional (3D) printing. These techniques involve the fabrication of 3D objects based on digital data representing the 3D objects. The digital data is broken down into a series of two-dimensional (2D) cross-sections and the 3D object is fabricated layer-by-layer. Stereolithography (SLA) is one type of 3D printing technique in which light is used to induce polymerization of monomers, oligomers, and/or prepolymers in a build composition, generally via radical polymerization reactions, to form solid plastic parts. Petroleum-based build compositions are often used, e.g., those including (meth)acrylate monomers/oligomers/prepolymers, in order to form plastic parts with desired mechanical properties.

SUMMARY

Provided are methods for additive manufacturing (AM) of objects using protein-based build solutions. By contrast to petroleum-based plastics, proteins provide objects which are biodegradable, biocompatible, and sustainably sourced. Although some AM techniques have been developed for use with proteins, such existing techniques have required functionalizing the proteins with polymerizable groups, e.g., (meth)acrylate groups, the incorporation of compounds having such polymerizable groups within the build compositions, or both, as well as including compounds capable of initiating polymerization reactions of such components. By contrast, the present methods take a different approach and make use of build solutions comprising proteins without such polymerizable groups. Rather than using polymerization to achieve solidification, the present methods generate heat in the liquid-phase build solution and induce thermal denaturation of the proteins followed by aggregation of denatured proteins to form solid 2D or 3D objects.

In an embodiment, a method for additive manufacturing of an object comprises providing a build solution comprising proteins and a solvent in an additive manufacturing system; generating heat in the build solution to denature proteins; and aggregating denatured proteins to form a solidified region of an object, the solidified region comprising denatured, aggregated proteins. The heat may be generated in a localized area of the build solution to denature proteins in the localized area, wherein the localized area is in contact with unheated build solution and the solidified region may be formed in the localized area of the build solution.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
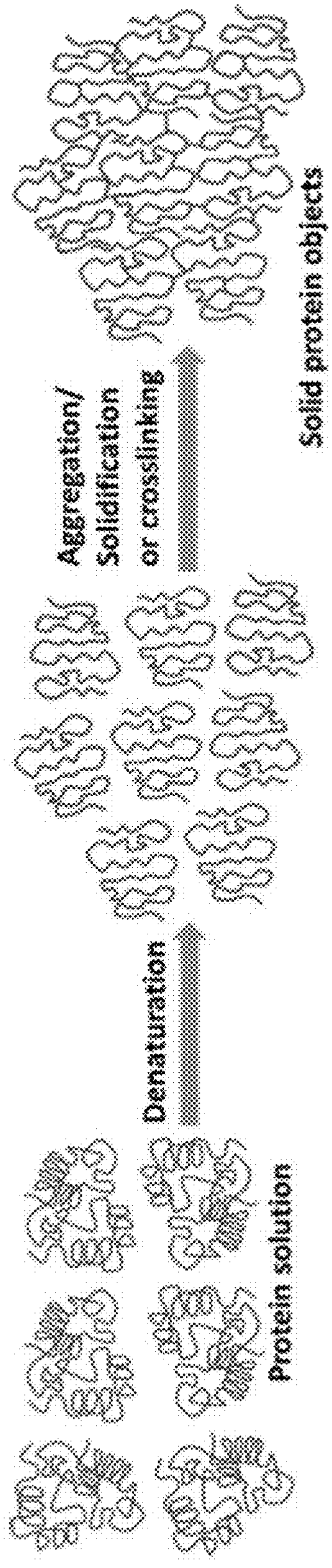
FIG. 1 illustrates the mechanism by which solid objects are fabricated from liquid protein-based build solutions using the present additive manufacturing methods.

As illustrated in FIG. 1, the present disclosure provides methods for additive manufacturing that employ thermal denaturation of proteins and aggregation of denatured proteins to convert liquid build solutions into solid objects. The methods comprise providing a build solution comprising proteins and a solvent in an additive manufacturing system; generating heat in the build solution to denature proteins in the build solution; and aggregating denatured proteins to form a solidified region comprising denatured, aggregated proteins. The heat may be generated within a localized area of the build solution (as opposed to throughout the entire volume of the build solution). In such embodiments, only proteins within this localized area are denatured and subsequently aggregate to form the solidified region in the localized area. Denaturing involves the loss of the proteins' native structure (quaternary, tertiary, and/or secondary structure) as it exists in the unheated build solution. Aggregation involves the assembly of individual denatured proteins together and may include the formation of covalent (e.g., disulfide bonds) and/or non-covalent (e.g., hydrogen bonding and van der Waals forces) bonds between denatured proteins and/or portions thereof. This leads to a network of entangled protein chains throughout the solidified region. Aggregation is induced by heat dissipating from the heated build solution (or localized area thereof) into the surrounding environment (which may be unheated build solution surrounding the localized area).

As further described below, the heating step may be carried out to form a solidified layer in the build solution, e.g., a layer of a plurality of solidified regions. Additional heating steps may be used to generate heat in additional localized areas of the build solution, inducing protein denaturation therein, followed by aggregation to form additional solidified regions, including additional solidified layers. The collection of fabricated solidified regions/layers forms a solid object, e.g., a three-dimensional (3D) object, the shape and dimensions of which can be controlled by the characteristics of the heating and digital data corresponding to the desired object.

As noted above, the solidification mechanism underlying the present methods involves thermal protein denaturation and aggregation of denatured proteins. This is by contrast to existing techniques which employ polymerization (e.g., radical polymerization) of various combinations of proteins comprising polymerizable chemical moieties, other compounds comprising polymerizable chemical moieties, and polymerization initiators to achieve solidification. In addition, the present methods enable the fabrication of solid objects from liquid solutions at relatively low protein concentrations and without using rheological modifiers.

Generating heat in the present methods may be carried out by illuminating a photothermal material in contact with the build solution with light. Unlike existing techniques which use light to induce polymerization as described above, the light in the present methods does not induce polymerization, nor are the proteins in the present methods involved in polymerization reactions (i.e., as reactants). Instead, the photothermal material absorbs the light to generate the heat, which increases the temperature of the build solution, which induces protein denaturation as described above. Heat dissipation decreases the temperature, resulting in aggregation of denatured proteins in the build solution to form the solidified region.

The photothermal material is a material which exhibits a photothermal effect upon illumination with the light. That is, the photothermal material is a material which undergoes a non-radiative conversion of absorbed electromagnetic energy, i.e., a light-to-heat conversion. Illustrative photothermal materials include metals (e.g., gold, silver, platinum, copper, etc.), metal oxides (e.g., iron oxide), semiconductors (e.g., Si, Ge, etc.), carbon-based materials (e.g., carbon black, graphene, graphite, etc.), near-infrared organic dyes (e.g., Indocyanine Green, croconaine dye, etc.), other organic dyes (e.g., Sudan IV, chlorophyll, etc.), and optically active polymers (e.g., polyaniline, polypyrrole, etc.). The photothermal material may be used in a nanostructured form (e.g., nanoparticles, nanotubes, nanorods, etc.), to enhance the photothermal effect due to surface plasmon resonance effects. Combinations of different photothermal materials may be used.

Figures 3A, 3B, 3C, 3D, 3E, 3F:
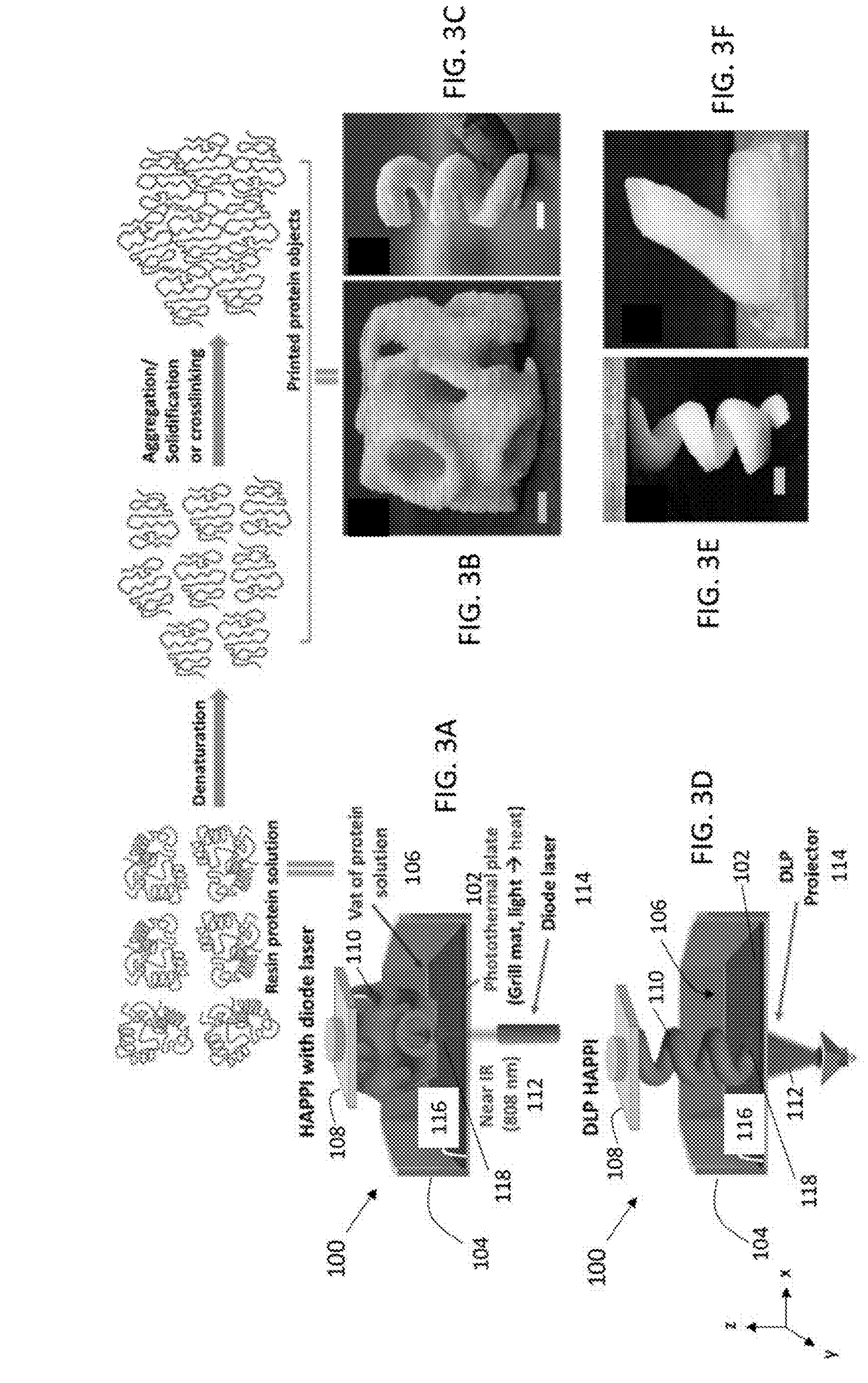
FIG. 3A shows an illustrative system which may be used to carry out an embodiment of present additive manufacturing methods involving heating at a patterned photothermal interface (HAPPI) using a diode laser.
FIG. 3B is a gyroid of BSA printed using the system of FIG. 3A.
FIG. 3C is a spiral of EWPs printed using the system of FIG. 3A.
FIG. 3D is another illustrative system according to FIG. 3A but employing a digital light processor (DLP) to carry out HAPPI.
FIG. 3E is a spiral of BSA printed using the system of FIG. 3D.
FIG. 3F is an overhang of BSA printed using the system of FIG. 3D. (Scale bar=1 cm).

The photothermal material may be provided in a photothermal base or plate in contact with the build solution at an interface. In such embodiments, the photothermal base may be a component mounted within the additive manufacturing system such that it forms the interface with the build solution and receives the light. For example, the photothermal base may be a part of (or mounted to) a container or vat configured to hold the build solution. An illustrative additive manufacturing system 100 comprising a photothermal base 102 that may be used to carry out such embodiments is shown in FIG. 3A. The system 100 comprises a container 104 configured to contain a build solution 106 comprising proteins and a solvent. The system 100 further comprises a build plate 108 on which an object 110 is fabricated. The photothermal base 102 comprises (or is composed of) the photothermal material and is mounted within the system 100 such that it can receive light 112 from a light source 114. The photothermal base 102 is further mounted so as to form an interface 116 with the build solution 106. Illumination of the photothermal base 102 on a surface opposite the interface 116 induces light-to-heat energy conversion due to the presence of the photothermal material. As noted above, the heat leads to a localized temperature increase at the interface 116 which induces denaturing of proteins in the build solution 106. An area of localized heating and the resulting solidified region (both of which depend upon the pattern of the illumination) are indicated with reference 118. Absent the illumination, e.g., when the light is blocked or moved to another location, the heat dissipates, resulting in aggregation of denatured proteins in the localized area to form the solidified region.

The object 110 may be formed in a layer-by-layer fashion. That is, after forming a first layer of solidified regions (i.e., a layer comprising a plurality of solidified regions including solidified region 118) using a first illumination step, the build plate 108 may be moved upwards (along the z axis). The first layer of solidified regions (adhered directly or indirectly to the build plate 108) separates from the photothermal base 102 at the interface 116 and additional build solution 106 flows to form a new interface with the photothermal base 102 (as well as an interface with the previously formed first layer). The photothermal base 102 is again illuminated with light 112 to generate heat, inducing denaturing, which dissipates, inducing aggregation to form a second layer of solidified regions. These steps may be repeated as desired.

The particular composition of the photothermal base (e.g., type of photothermal materials used, presence of additional materials), transparency or non-transparency of the photothermal base to the light, shape and size (e.g., thickness) of the photothermal base, thermal conductivity and stability of the photothermal base, etc. may be selected to achieve a desired localized temperature increase so as to facilitate denaturing. If the photothermal base is not transparent to the light being used, the light does not transmit into the build solution during these embodiments of the present methods.

Figure 12:
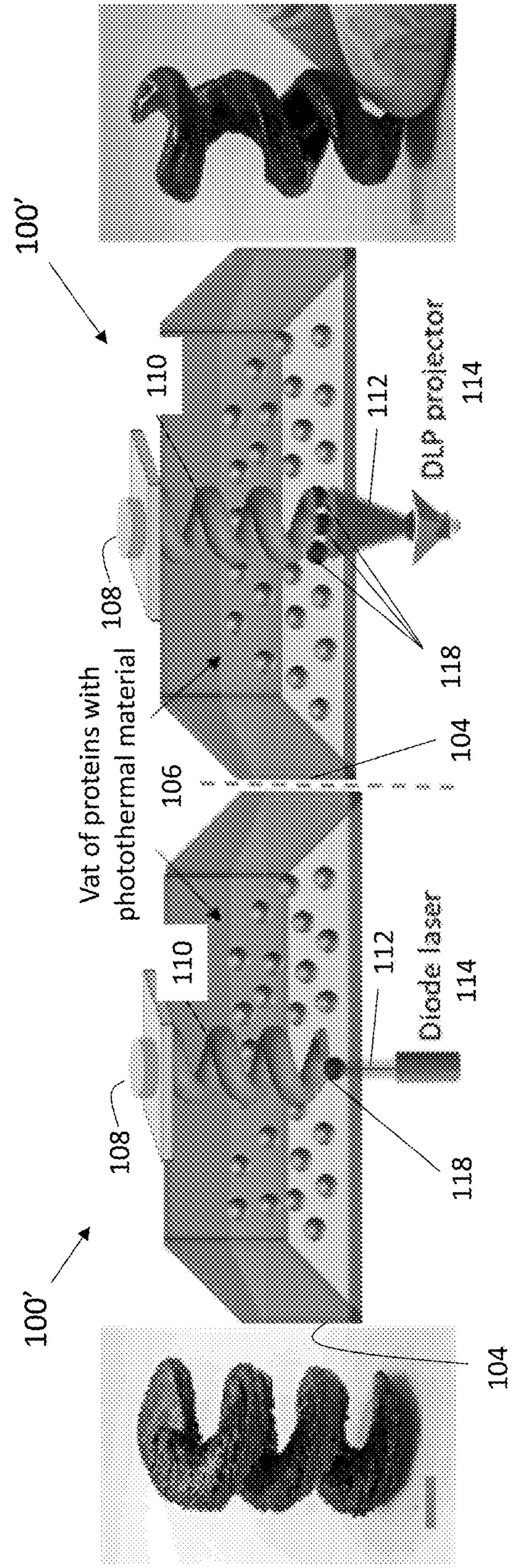
FIG. 12 shows an illustrative system which may be used to carry out another embodiment of present additive manufacturing methods involving a resin solution of BSA and photothermal dyes dispersed therein. The resin solution is illuminated with a diode laser (left) or a DLP projector (right). The spiral on the left was printed using IR-806 as the photothermal dye and the spiral on the right was printed using bromothymol blue as the photothermal dye. (Scale bar=1 cm)

Alternatively, the photothermal material may be provided within the build solution itself, i.e., dispersed throughout the solvent. As shown in FIG. 12, in such embodiments, a system 100' which is similar to system 100 of FIG. 3A may be used except that the container 104 need not comprise the photothermal material/photothermal base. For example, commercially available stereolithography (SLA) systems may be used. In addition, in a variation on the embodiments shown in FIG. 12, the light may be transmitted through the build plate 108 to illuminate the build solution, generating heat at localized areas along an interface formed between the build plate and the build solution as described above, thereby inducing protein denaturing in localized areas followed by aggregation. Analogous to the description above, objects may be formed in a layer-by-layer fashion using such SLA systems.

Other mechanisms of generating heat may be used in the present methods, including inductive heating. For example, generating the heat may be carried out by exposing an electrically conductive material in contact with the build solution to a changing magnetic field provided by an inductive heater. Systems similar to system 100 of FIG. 3A and system 100' of FIG. 12 may be used except that the electrically conductive material is used in place of the photothermal material (although some of the photothermal materials listed above may be used as the electrically conductive material) and the inductive heater is used in place of the light source 114 so as to provide the changing magnetic field instead of the light 112. The electrically conductive material may be provided as a base or plate mounted to the container 104 as shown in FIG. 3A or dispersed throughout the build solution 106 as shown in FIG. 12. Otherwise, the solidification mechanism and fabrication of the desired object is analogous to what has been described above.

As another example involving inductive heating, generating the heat may be carried out by contacting a thermally conductive material (which is in contact with the build solution) with a moveable (e.g., via a spring loaded, retractable ball point roller) inductive heater. The thermally conductive material and the moveable inductive heater are in direct contact. Systems similar to system 100 of FIG. 3A may be used except that the thermally conductive material is used in place of the photothermal material (although some of the photothermal materials listed above may be used as the electrically conductive material) and the moveable inductive heater is used in place of the light source 114. The thermally conductive material may be provided as a base or plate mounted to the container 104 as shown in FIG. 3A. Otherwise, the solidification mechanism and fabrication of the desired object is analogous to what has been described above As noted above, the build solution to be used in the present methods comprises proteins. ("Resin solution" and "resin formulation" may also be used interchangeably with "build solution.") The term "solution" is used both in reference to the liquid-phase nature of the build solution and the fact that the proteins are dissolved therein. This is by contrast to solid/liquid mixtures such as slurries. In the build solution and prior to the heat generating step in the present methods, the proteins are generally in their native form (i.e., "native proteins". By "native proteins" it is meant proteins having an intact, properly folded structure (quaternary, tertiary, and secondary structure) enabling the native proteins to exhibit their normal functionality. However, in some embodiments, at least some proteins which are at least partially denatured may be included in the build solution. The proteins to be used may be natural (i.e., existing in nature) or non-natural (i.e., synthetic, including mutated). However, the proteins to be used have not been chemically functionalized or modified to include polymerizable chemical moieties. (This does not preclude the presence of cross-linkable groups such as —SH groups which are inherently present in the protein due to its particular amino acid sequence.) Thus, the proteins to be used may be referenced as being "unfunctionalized" or "unmodified." This includes proteins which do not comprise unsaturated moieties such as carbon-carbon double bonds and carbon-carbon triple bonds. This includes proteins which do not comprise moieties such as (meth)acrylate, (methyl) acrylamide, benzophenone, epoxy, imide, alkene, alkyne, and succinimide. Thus, the proteins to be used may be free of one or more (including all) of these moieties.

Otherwise, a variety of types of proteins may be used in the present methods. Selection of proteins may be guided by a desired application for the fabricated object, including its desired mechanical properties. However, suitable proteins include those comprising certain amino acids (e.g., cysteine, lysine, etc.) that facilitate protein-protein aggregation (including covalent and/or non-covalent bonding) after denaturing. Suitable proteins include those having a weight average molecular weight Mw in a range of from 10 to 500 kDa. This includes from 50 to 450 kDa, from 100 to 400 kDa, and from 150 to 350 kDa. Suitable proteins include those that denature at the temperatures attained by the generated heat, as further described below. This includes proteins that denature at a temperature below the boiling point of the selected solvent(s). This further includes proteins that exhibit an endothermic transition (e.g., a first endothermic transition) at a temperature that is at, or below the temperature attained by the generated heat. The temperature at which the endothermic transition occurs for the selected protein may be determined using DSC as described in the Example below (see FIG. 2.) Plant proteins such as soy proteins, wheat proteins, etc. may be used. Animal proteins such as bovine serum albumin (BSA), whey protein isolate (WPI), egg albumin, egg white protein (EWP), etc. may be used. Some proteins may be excluded from use in the present methods, e.g., gelatin. A single type of protein or multiple, different types of proteins may be used. The term "type" is used in reference to the chemical composition of the protein.

The build solution may comprise various amounts of the proteins, but generally comprises an amount to achieve the solidified regions described herein while also ensuring that the proteins dissolve in the build solution. This includes the amount being below the saturation limit in build solution at room temperature. The amounts depend upon the selected protein, but illustrative amounts include at least 0.5 weight %, at least 1 weight %, at least 5 weight %, and at least 10 weight %. Illustrative amounts include ranges between any of these amounts and ranges of from 0.5 to 40 weight %, from 1 to 35 weight %, from 5 to 30 weight %, from 10 to 25 weight %, from 20 to 40 weight % and from 25 to 35 weight %. ("Weight %" refers to the total weight of the proteins as compared to the total weight of the build solution.)

The build solution further comprises a solvent which provides a liquid medium in which the proteins are solubilized and in which other components, e.g., photothermal material, electrically conductive material, may be dispersed. Thus, suitable solvents include those that sufficiently solubilize the selected proteins at the selected amounts at room temperature (although additives may be included to facilitate solubility as described below). Illustrative solvents include water, alcohols, sulfoxides (e.g., dimethylsulfoxide), amides (e.g., N-methylpyrrolidinone, N,N-dimethylformamide). A single type of solvent or multiple, different types of solvents may be used.

The build solution may further comprise additives. Illustrative additives include pH agents, buffers, salts, polyphenols (e.g., tannins, phenolic acids, flavonoids, etc.), reducing agents (tris(2-carboxyethyl) phosphine), plasticizers (e.g., glycerol), etc. Other illustrative additives include fillers, e.g., glass, metal oxide, silica, metal particles. The type of additive(s) and amount thereof may be selected as desired, including to facilitate denaturation, aggregation, and solubility as described above, as well to tune the properties of the fabricated object. However, in embodiments, the build solution is free from certain additives such as gelling agents (e.g., polysaccharides such as cornstarch, sucrose, carrageenan), compounds comprising any of the polymerizable chemical moieties described above (e.g., (meth)acrylates, (meth)acrylamides), and polymerization initiators (e.g., radical initiators). These types of additives are not necessary since the present methods achieve solidification using the proteins themselves.

In embodiments, the build solution consists of any of the disclosed proteins, any of the disclosed solvents, and any of the disclosed additives. In embodiments, the build solution consists of any of the disclosed proteins, water, and optionally, one or more additives selected from a pH agent, a buffer, a reducing agent, and glycerol.

In embodiments, the build solution is at room temperature prior to the heat generating step that induces denaturation. In other embodiments, the build solution may be at a temperature greater than room temperature prior to the heat generating step. This may be useful to facilitate protein solubilization. The temperature of the build solution prior to the heat generating step, however, is lower than the temperature used to induce denaturation. In embodiments, the build solution has a temperature (prior to the heat generation step) in a range of from room temperature to less than 55° C. This includes from room temperature to less than 50° C., from room temperature to less than 45° C., from room temperature to less than 40° C., from room temperature to less than 35° C., and from room temperature to less than 35° C.

Upon generating the heat in the present methods, the temperature to be attained in the build solution (including the localized area) to induce denaturation depends, in part, upon the selected proteins. Efficient denaturation is desired, but protein degradation is desirably minimized and efficient heat dissipation to induce aggregation is also desirable. Illustrative temperatures to induce denaturation include those in a range of from 60° C. to 200° C., from 70° C. to 175° C., from 80° C. to 150° C., from 90° C. to 125° C., or from 100° C. to 120° C. The duration of the increased temperature in the build solution may be no more than 10 minutes, no more than 5 minutes, or a range of from 1 minute to 5 minutes.

If the heat is generated via light illumination, the light may have a wavelength (or range of wavelengths) in the near-infrared region of the electromagnetic spectrum, e.g., from 700 nm to 1200 nm, from 700 nm to 1000 nm, or from 750 nm to 850 nm. However, other wavelengths may be used. The light may be focused or otherwise shaped to achieve a desired illuminated area. As described above, this controls, in part, the size of the localized heated region (and thus, the size of the solidified region).

The source of the light is not particularly limited. Laser light may be used as it can be intense and tightly focused, providing small illuminated areas and thus, fine details and high resolution. The light may be patterned. Patterned illumination may be achieved by moving a single light beam (e.g., a laser) according to a predetermined pattern (i.e., scanning). Patterned illumination may also be achieved by using a digital light processing (DLP) projector as the light source. Whether the illumination is sequential (scanning) or simultaneous (DLP), the illumination step of the present methods creates a corresponding pattern of heated areas and thus, a corresponding pattern of solidified regions.

If the heat is generated via induction, characteristics of the inductive heater may be adjusted to achieve the temperatures and durations described above. In the inductive heating embodiment carried out by contacting a thermally conductive material (which is in contact with the build solution) with a moveable inductive heater, the size and shape of the contact area of the inductive heater with the thermally conductive material can be varied. The amount of electrical current supplied to the inductive heater can be changed, thus changing the temperature of the inductive heater itself. Patterned inductive heating may be achieved analogous to patterned illumination by using movable and adjustable inductive heating elements.

The present methods may (but need not) include additional steps. For example, an additional step may comprise exposing the fabricated object to heat, e.g., via an oven. This may induce further protein denaturation and aggregation in the fabricated object. An additional step may comprise exposing the fabricated object to a chemical (e.g., tannic acid) that induces further protein aggregation. Either of these additional steps is distinguished from the heat induced protein denaturation/aggregation steps described above in which the heat is generated in the build solution itself to achieve a liquid-to-solid conversion. By contrast, the additional steps in this paragraph are not carried out on the build solution, but rather the fabricated object to further tune the properties of the already solid fabricated object. Finally, the present methods need not comprise any step that induces a polymerization reaction, including a radical polymerization reaction.

The solidified regions described herein, including the fabricated objects composed of such solidified regions may be characterized by their degree of solidification. The solidified regions/fabricated object may be characterized as having fixity, meaning the solidification is sufficient to allow the solidified regions/fabricated object to freely stand under its own weight without deforming. In embodiments, the solidified regions/fabricated object is fully solidified, e.g., greater than 95% of the proteins therein have been converted into an insoluble, intractable, solid form. In other words, the solidified regions/fabricated object may be characterized as having a gel fraction of greater than 95%. The degree of solidification described in this paragraph may refer to solidification achieved by the heat generating step(s) alone, rather than that achieved after use of an additional step performed after fabrication, if any.

The solid matrix of the fabricated objects is composed of the aggregated, denatured proteins. Thus, the composition of the fabricated objects depends upon the selected proteins as well as any additives present (if used). However, at least in embodiments, the fabricated objects may be characterized as being free of any of the components excluded from the build solutions as described above. This includes the fabricated objects being free of any of the disclosed polymerizable chemical moieties (as well as the corresponding chemical form of such polymerizable chemical moieties). As shown in FIG. 4, surfaces of the solid matrix may define a plurality of pores distributed throughout. These pores differ from any voids that may be engineered into the fabricated object as a result of the digital data associated therewith.

The fabricated objects may be characterized by additional properties, including mechanical properties such as Young's modulus, compressive modulus, etc. The present methods are able to achieve fabricated objects having a wide range of mechanical properties, depending upon their desired application. This includes strong, stiff fabricated objects similar to hard plastics such as acrylonitrile butadiene styrene (ABS) as well as soft, flexible, elastomeric plastics such as polyurethanes, natural rubber, and silicones. The mechanical properties may be measured using known techniques, including those described in the Examples, below.

The fabricated objects may be used in a variety of applications, including food products; nutritional supplements; structural (engineering) materials, including load-bearing such materials; medical implants; drug delivery devices; packaging materials; etc.

EXAMPLES

Example 1

The systems shown in FIGS. 3A and 3D were used to fabricate a variety of objects from aqueous build solutions comprising different proteins, including bovine serum albumin (BSA), whey protein isolate (WPI), egg white protein (EWP), and egg albumin. For BSA, build solutions containing 35 weight % BSA in deionized water or a pH 6.6 buffer solution with 15 mM tris(2-carboxyethyl) phosphine were used. For WPI, build solutions containing 40 weight % WPI in deionized water were used. For EWP, build solutions containing 35 weight % EWP in deionized water were used. For egg albumin, the build solution was estimated to contain about 11 weight % protein. For some experiments, laser light having a wavelength of 808 nm was used. The laser light was directed through a fiber optic cable (core diameter up to 550 μm) and a collimator (beam output up to 5 μm). Laser intensities of up to 8 W were used. For other experiments, a digital light processing (DLP) projector was used to provide white light. In both sets of experiments, illumination durations of from 1 to 5 minutes per layer were used. The photothermal base was a black grill mat, i.e., fiberglass coated with black polytetrafluoroethylene. No post-processing steps were used for any of the fabricated objects. Fabricated objects included those having a shape of a screw, a dogbone, a cylinder, and a gyroid. screw shaped object, a dogbone shaped object (images not shown here).

Tensile tests were conducted on dogbone shaped objects (25 layers) fabricated from build solutions comprising BSA. The tensile tests were conducted using the MTS Criterion Model 43 with a 50-kN load cell at an extension rate of 5 mm/min. Elongation of the sample with line marks was recorded by taking videos, and the strain was calculated by image analysis. Average values from three runs were reported. The results showed a Young's modulus of 119±52 MPa; maximum stress of 7±2 MPa; and an elongation at break of 40%±8%.

Compressive tests were conducted on cylindrical shaped objects (30 layers) fabricated from build solutions comprising BSA. Compressive tests were conducted by the MTS machine at 1.3 mm/min of crosshead velocity. Prior to tests, all the samples were hydrated by immersing in deionized water. "As-printed" samples were not subjected to any post-processing steps. The results for these samples showed a compressive modulus of 2.3±0.4 MPa and a stress at 80% strain of 9.4±1.8 MPa. Other samples were subjected to exposure to tannic acid and heat at 120° C. The results for these samples showed a compressive modulus of 62±9 MPa and a stress at 80% strain of 161±20 MPa.

Example 2

Introduction

Similar to Example 1, Example 2 also reports a vat-based additive manufacturing (3D printing) method that leverages protein denaturation as the sole curing mechanism of a resin solution comprising proteins. This approach avoids the use of chemical modification of proteins, exogenous polymerizable compounds, and exogenous rheological modifiers. Instead, the present method allows for control over the location of photothermal transduction such that protein aggregation drives the conversion of aqueous resin into solid parts. This provides a safe and sustainable approach to the production of complex, three-dimensional (3D) objects that maintain full biodegradability.

Experimental

Materials

BSA was purchased from Nova Biologics, Inc, and used as received. Dried EWP (type H-40) containing 80% protein was donated by Wabash Valley Produce, Inc. and used as received. Tris(2-carboxyethyl) phosphine hydrochloride (TCEP), pepsin (2,500 units/mg), bromothymol blue sodium salts, IR-806, and glycerol were purchased from Sigma-Aldrich and used as received.

Resin Formulation

For heating at a patterned photothermal interface additive manufacturing (HAPPI AM) with a diode laser, aqueous BSA solution was prepared in DI water at 35 wt % BSA (e.g., 43 g of BSA in 80 mL of water). For HAPPI AM using DLP equipment, BSA (43 g) was dissolved in 68 mL of pH 6.6 citrate-phosphate buffer solution at 35 wt % with addition of 12 mL of 100 mM TCEP solution to obtain a 15 mM TCEP solution. The buffer solution was prepared by mixing 27 mL of 0.1 M aqueous citric acid and 72 mL of 0.2 M aqueous sodium phosphate dibasic. Aqueous solutions of photothermal dyes (25 mg/mL of bromothymol blue sodium salt in DI water) for AM with DLP were added into BSA solutions at 0.1 wt % relative to the entire resin solution. Aqueous solution of photothermal dyes, IR-806 (10 mg/mL) for AM with diode laser were added into BSA solution at 0.15 wt % out of the whole resin solution. For BSA solution in water/glycerol mixture, BSA (46 g) was dissolved in mixture of 50 mL DI water and 23 g of glycerol (glycerol/protein=0.5 (w/w)).

Additive Manufacturing Via Protein Denaturation (AMPD)

For HAPPI AM with a diode laser, the system that was used is schematically shown in FIG. 3A. One of the commercial vats for the DLP 3D printer was used, which was a square prism (370×370 $mm^2$, void: 300×300 $mm^2$). The open bottom of the vat was covered by a grill mat (0.2-mm thickness). For HAPPI AM with a diode laser, Repetier-Host was used to load STL files, slice and operate printing. The STL files were converted to G code files using Prusa slicer. The infill pattern was grid at 95% density. A diode laser with a wavelength of 808 nm was purchased from Opto Engine LLC (Midvale, UT, USA). The laser light was directed through a fiber optic cable and a collimator creating a 550 μm beam diameter. The distance between the collimator of the laser and the bottom of the vat was fixed to 15 mm. Major print speed was 1200 mm/min or 900 mm/min for dogbone or gyroid shapes, respectively. For HAPPI AM with a DLP projector, the DLP projector was purchased from ViewSonic (model: PA503W). The distance between the projector and grill mat was 11 cm. A focal lens was put on the projector lens to improve resolutions of projected images while keeping the same light intensity. Each layer of a spiral was cured for 2 minutes. For photothermal vat, common FEP (0.15-mm thickness) film for 3D printers or PFE film (with 0.25-mm thickness purchased from CS Hyde Company) was used for HAPPI DLP or HAPPI with diode laser, respectively.

Biodegradation

Procedures for biodegradation assays of printed BSA cylinders were conducted at 37° C. in a shaking incubator at 137 rpm. Pepsin solution as an incubation medium was prepared by dissolving pepsin at 3.2 g/L in 0.1 M HCl. Pepsin solution was replaced every second day to maintain maximum enzymatic activities of pepsin. Three groups of four cylinders (20×20×6 $mm^3$) were printed by HAPPI AM using a DLP projector. Three cylinders were studied at each time point, 5, 10 days or until full degradation with or without post-curing at 120° C. for 3 hours. Samples were taken out of the pepsin solution and dried in the air for 3 days, and under vacuum for 1 h before measuring remaining dry mass. Reported values are the average±one standard deviation for three replicate measurements.

Instruments

Differential scanning calorimetry (DSC) studies were conducted on a TA DSC Q200 calorimeter under nitrogen. Aqueous protein solutions at 35 wt % were sealed in an aluminum pan, and heat flow was recorded while heating at 10° C./min using DI water as a reference. The moisture content of each dogbone sample after tensile tests was measured by thermogravimetric analysis (TGA) conducted on a TA TGA Q50 by holding the sample at 100° C. for 100 minutes under nitrogen. Kinematic viscosities (ν) of BSA solutions at 35 wt % were measured using a capillary viscometer (IIc without glycerol, IIIc with glycerol), at 27° C. with SCHOTT viscosity measuring units, AVS 360. Viscosity was calculated as ν=Kt where K is the equipment calibration constant, 0.3106 $mm^2s^{-2}$ for IIc or 2.987 $mm^2s^{-2}$ for IIIc, and t is the measured flow time in seconds. The flow time was measured three times, and the average viscosity is reported ±one standard deviation. Samples for density measurements and scanning electron microscopy (SEM) were prepared by HAPPI AM of a rectangular prism (20×20×15 $mm^3$), cut into four pieces (10×10×15 $mm^3$), and dried in the air for three days or until constant mass. The average densities of three samples were measured by recording masses using the analytical balance and calculating volumes based on the dimensions using a digital caliper. SEM was conducted using a Zeiss Gemini SEM 450 at an accelerating voltage of 5 kV. Samples for SEM were sputter-coated with 5- or 10-nm thick platinum.

Uniaxial tensile testing was conducted using the MTS Criterion Model 43 with a 50-kN load cell at an extension rate of 5 mm/min. ASTM D638 type V samples for tensile testing were prepared by HAPPI AM. After printing, samples without glycerol were treated with tannic acid solution ([tannic acid]=300 mg/mL) for three days, dried in ambient conditions for 5 h, and then heated in the oven at 50° C. for 30 minutes and then at 100° C. for 30 minutes under mild pressure to prevent any warping while drying. Samples with glycerol were dried in ambient conditions for two weeks. It is noted that ambient conditions were recorded as 21±1° C. with 33±15% humidity across the 6 months of the studies. Post-thermal curing was done in the oven at 120° C. for three hours. Prior to post-curing, printed dogbones were dried for two weeks since any remaining moisture inside dogbones produced bubbles during post-curing. Prior to tensile testing, dogbones of BSA (no glycerol) with or without post-curing were hydrated by immersing in DI water for 15 hours. Otherwise, samples were broken at the grips. For aging studies, BSA samples with glycerol without post-curing were stored in ambient conditions over for two weeks, one, two or three months. Dogbones of BSA with glycerol after post-curing were tested after 2 days, one, two or three months. Compressive tests were done by the MTS machine at 1.3 mm/min of crosshead velocity. Cylinders with 20-mm diameter and 12-mm height for compressive testing were prepared by HAPPI AM. BSA samples without glycerol after post-curing were hydrated by immersing them in DI water prior to mechanical tests. Dynamic mechanical analyses (DMA) on rectangles of BSA with and without glycerol were done on a PerkinElmer DMA 8000. Samples with and without glycerol were each dried in ambient conditions for two weeks and then post-cured at 120° C. for 2 h (with glycerol) or 90 min (without glycerol). Sinusoidal forces were applied to rectangular samples within linear viscoelastic regions (strain=0.05) at a constant frequency (1 Hz) as a function of temperature. Temperature ranges for analyses were −80 to 150° C. for samples prepared with glycerol, and 35 to 220° C. for samples prepared without glycerol. The heating rate was 2° C./min for all samples.

Results and Discussion

DSC of BSA and EWPs

Figure 2:
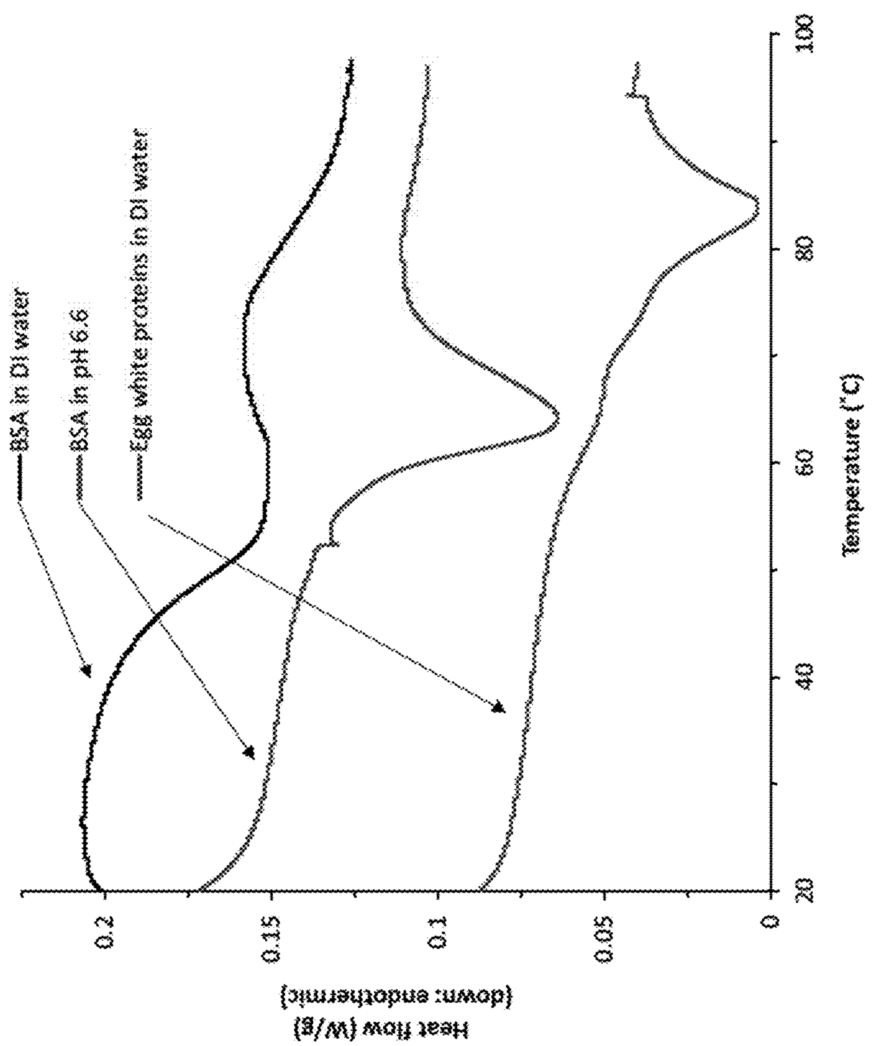
FIG. 2 shows differential scanning calorimetry (DSC) thermograms of bovine serum albumin (BSA) in deionized (DI) water, BSA in pH 6.6 and egg white proteins (EWPs) in DI water at 35 wt %.

The thermal transitions for aqueous solutions of BSA and EWP were first evaluated using differential scanning calorimetry (DSC), given that thermal denaturation is the envisioned mechanism for solution-to-solid curing that can be achieved in HAPPI AMPD. DSC studies on BSA (35 wt % in DI water or pH 6.6 buffer) as well as EWP (35 wt % in DI water) each showed endothermic transitions consistent with thermal denaturation (FIG. 2). BSA in DI water shows a relatively broad transition with a peak at 58° C. followed by another transition starting at 77° C. For BSA in pH 6.6 buffer, a transition at 65° C. was observed, and EWP in DI water showed a single transition at ca. 85° C. The thermal transitions were used to guide the experimental setup and printing parameters using HAPPI.

HAPPI AMPD of Aqueous BSA and EWP Resin Formulations

Next, empirical evaluation of layer-by-layer formation of 3D structures using HAPPI AMPD was carried out. The HAPPI technology was employed to generate patterned heat on a photothermal plate that served as the bottom of the resin vat. Two different approaches to HAPPI AMPD were evaluated, one using a diode laser (808 nm) and another using a digital light processing (DLP) projector (FIGS. 3A and 3D). The required BSA concentration for printability was 25-35 wt %. Below 25 wt %, reproducible structural integrity (fixity) during printing was not achieved, and above 35 wt %, some protein did not dissolve. Similarly, a 35 wt % solution of EWPs worked well in the setups, giving homogeneous formulations and good fixity during printing. Furthermore, kinematic viscosities of a 35 wt % solution of BSA at 27° C. were measured to be 501±3 cSt with glycerol and 123±2 cSt without glycerol, which are suitable for vat-type 3D printing.

FIG. 3A shows a simplified diagram of the HAPPI printer with a diode laser (SLA-type setup), and representative products that were produced with this setup: a gyroid of BSA (FIG. 3B) and a spiral of EWPs (FIG. 3C). FIGS. 3D, 3E, and 3F depict the DLP HAPPI printer, as well as a spiral and overhang structures, each printed by DLP HAPPI. Application of a diode laser in HAPPI AM is able to achieve temperatures higher than 140° C. within seconds, which demonstrates its capability to induce thermal denaturation of proteins. The patterned heat leads to localized denaturation of proteins and solidification of protein material within the build layer. In HAPPI AMPD, solidification of BSA solution at temperatures close to the first transition in the denaturation process (58° C.) was observed.

In comparison with the temperatures that can easily be achieved with the laser setup, 58° C. is relatively low. It was found that use of a safer, lower intensity DLP projector, in comparison with the diode laser, could also achieve the temperatures necessary for curing of the protein solutions. In DLP, the image for an entire layer is projected at once onto the photothermal plate, which results in lower local light intensity and heat generation compared with the laser-based setup. In general, the diode laser, which provides much higher light intensity with better localization in comparison with the DLP setup, was better suited for AM of complex structures and gave higher resolutions of printed objects (as assessed visually). On the other hand, the DLP-based setup provided straightforward production of parts with simple geometries and offers a safer, more accessible option. A pH 6.6 buffer solution was selected as a solvent to increase the extent of denaturation upon heating, in comparison with results using a pH 7.4 solution. Importantly, the pH is desirably maintained above 6.0 to avoid coagulation of the protein mixture. In some cases, a reducing agent, TCEP, was also added to increase the extent of denaturation via disruption of intramolecular disulfide bonds, which promotes unfolding. The concentration of TCEP was limited to 15 mM, however, to prevent pre-gelation at room temperature prior to printing.

Figure 4A:
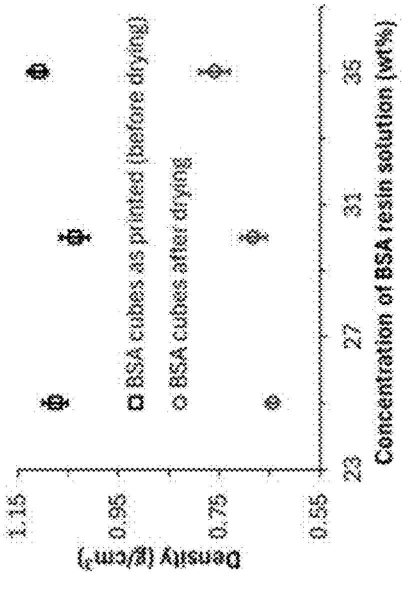
FIG. 4A plots the density of BSA cubes as printed or after drying at different concentrations of the build solution. Values represent an average of three experiments, error bars=1 standard deviation. Scanning electron microscope (SEM) cross-sectional images of a dried BSA cube printed from resin (build) solutions containing (FIG. 4B) 25 wt %, (FIG. 4C) 30 wt %, and (FIG. 4D) 35 wt % BSA (scale bar=300 μm).

To further investigate the properties of printed parts, the BSA-based formulations were used to evaluate printing conditions, the effects of plasticizers, and the effects of thermal post-processing. Across the range of BSA concentrations, it was found that the density of the dried printed parts correlated with the wt % of BSA in the resin formulation. Before drying, the as-printed parts were found to have similar densities of 1.07, 1.04 and 1.11 g/cm$^3$ for resin solutions having 25, 30 and 35 wt %, respectively. After drying, the same parts had densities of 0.64, 0.68 and 0.76 g/cm$^3$, respectively (FIG. 4A and Table 1). Upon seeing the ca. 30-40% reductions in densities, formation of pores in the printed and dried specimens was expected. To investigate, several specimens were analyzed using SEM (FIGS. 4B, 4C, and 4D) and the parts were confirmed to be highly porous. The average pore sizes were similar (ca. 200-μm diameter) for specimens produced with different wt % of BSA in the resin (Table 1). Qualitatively, based upon the SEM images, a greater number of open pores formed in parts made from 25 wt % solutions than those made from solutions containing higher wt % of BSA.

TABLE 1

Density of BSA cubes as printed or after drying, and pore size of BSA across layers at different concentrations of resin solution.

| Concentration of BSA resin solution (wt %) | Density (ρ) of BSA cubes (g/cm$^3$)[a] As printed | After drying | Δρ (%) after drying | Pore size (μm)[b] |
|---|---|---|---|---|
| 25 | 1.07 ± 0.03 | 0.64 ± 0.01 | 40 ± 2 | 195 ± 98 |
| 30 | 1.04 ± 0.03 | 0.68 ± 0.02 | 34 ± 2 | 247 ± 80 |
| 35 | 1.11 ± 0.02 | 0.76 ± 0.03 | 32 ± 2 | 178 ± 97 |

Figure 4B:
Figure 4C:
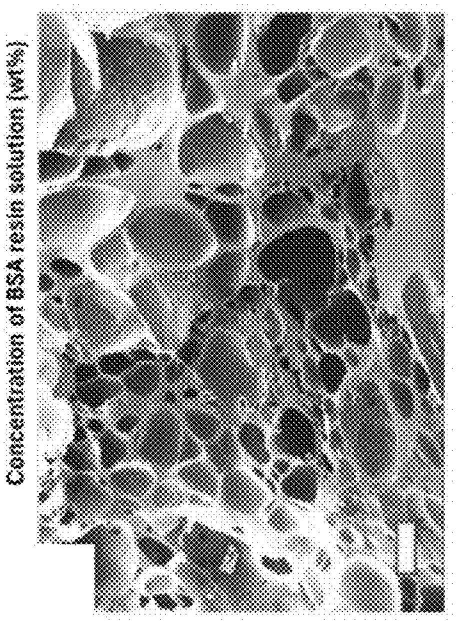
Figure 4D:
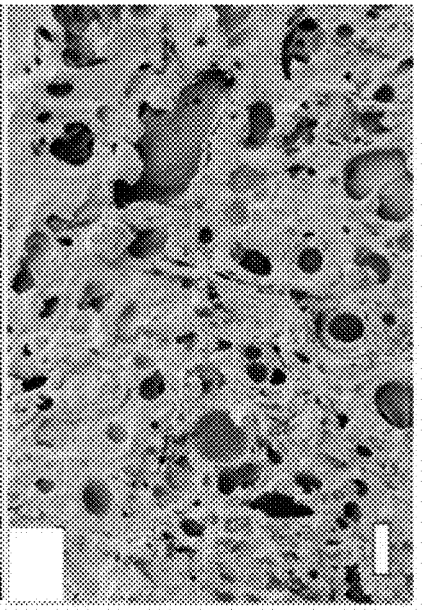

[a]Values represent an average of three experiments, error bars = 1 standard deviation.
[b]Pore size as the longest distance was measured by ImageJ analysis on 45 pores in the SEM images of FIGS. 4B-4D.

Figure 5C:
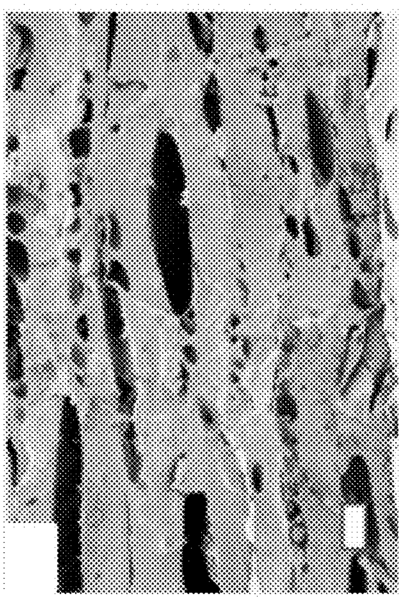
FIGS. 5A-5C show SEM cross-sectional images of a BSA cube printed from resin solutions containing (FIG. 5A) 25 wt %, (FIG. 5B) 30 wt %, and (FIG. 5C) 35 wt % BSA (scale bar=300 μm). These images were taken across layer lines.
Figure 5B:
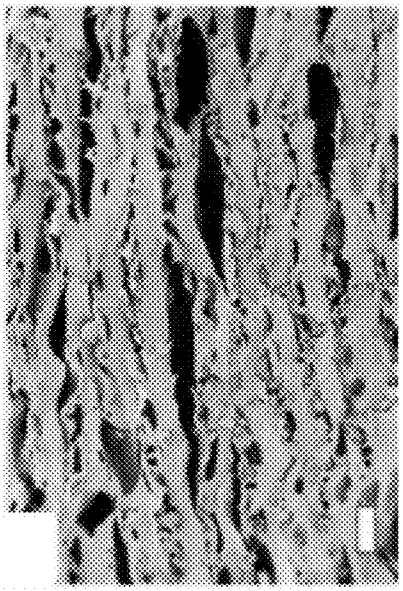
Figure 5A:
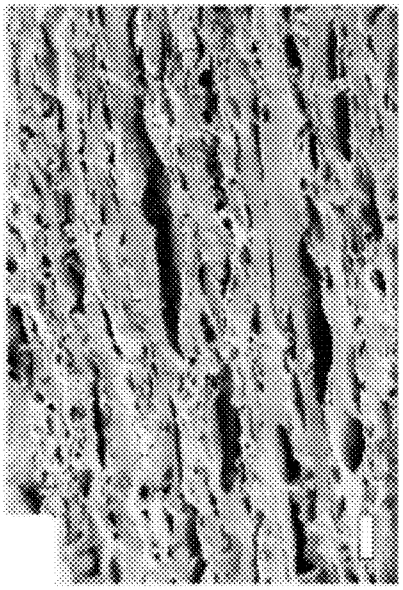
Figure 6:
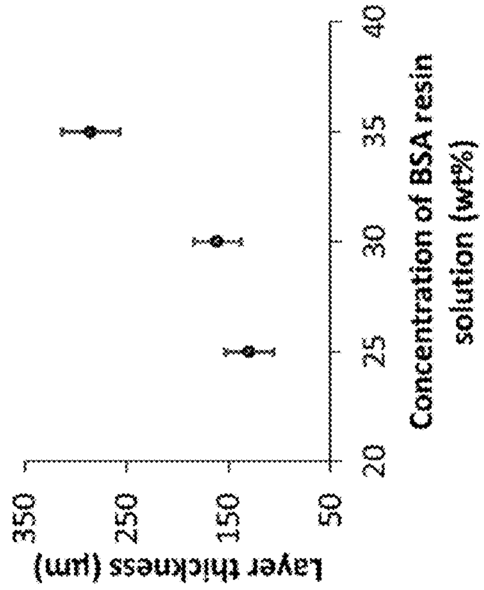
FIG. 6 plots layer thickness of printed BSA at different concentrations of BSA in the resin solution. Values represent an average of three experiments, error bars=1 standard deviation.

Similar results from SEM analysis of the side-on view of the layers within the specimen were observed (FIG. 5A-5C). In the side-on analyses, it was found that the average layer thickness increased with increasing wt % of BSA in the resin, from 130 to 161 to 285 μm as resin concentration increased from 25 to 30 to 35 wt % (FIG. 6). The impact of drying the specimens does not appear to cause global shrinkage of the part, but instead creates layer spacings and open pores throughout, which alters the density and potentially offers a means to produce bioplastic parts with tunable mesoscale architectures.

Assessment of Mechanical Properties

Figure 7:
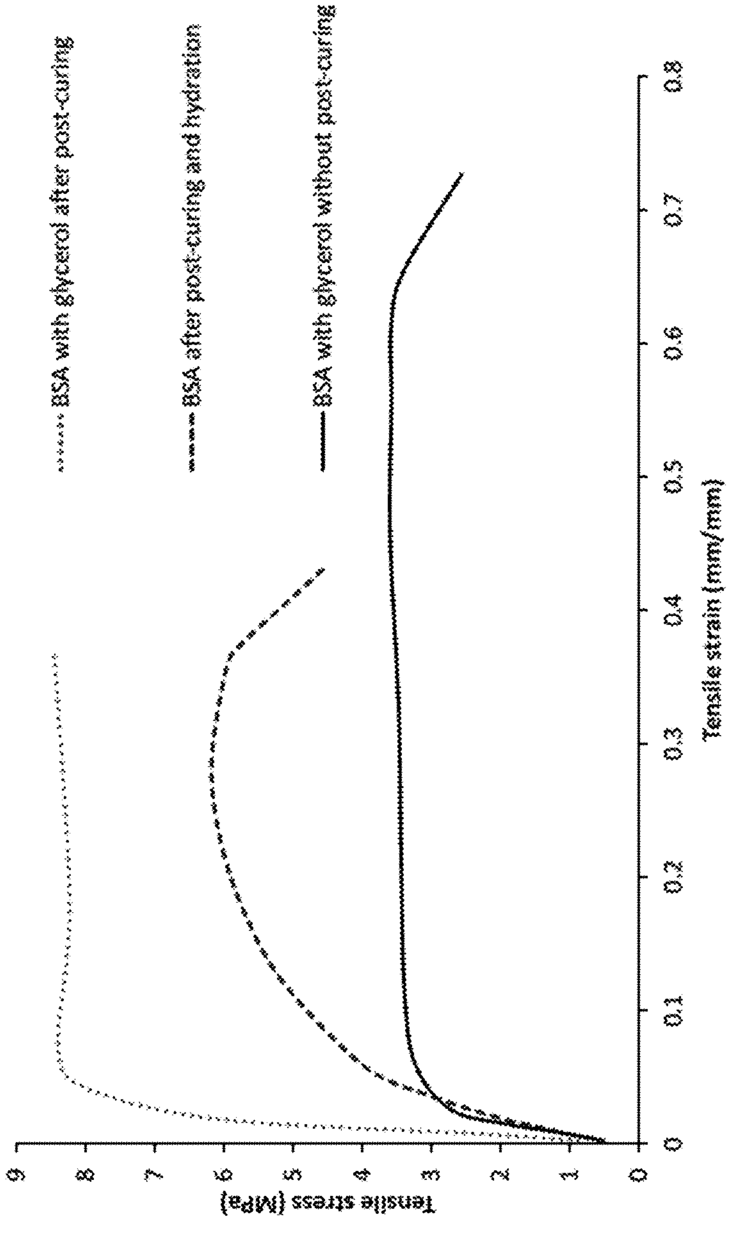
FIG. 7 plots results from tensile tests on printed dogbones of BSA with glycerol without post-curing (solid), BSA with glycerol after post-curing (dashed dots), and BSA after post-curing and hydration (dashed lines).

The mechanical properties of HAPPI AMPD specimens were examined using uniaxial tensile and compression tests, as well as dynamic mechanical analysis. FIG. 7 and Table 2 show results from tensile tests on dogbones of BSA printed from aqueous media versus those printed from water-glycerol mixtures. Notably, although aqueous BSA formulations printed well in the HAPPI setup, the dogbone specimens were found to be too brittle for analysis after thermal post-curing. Samples in their as-printed form from aqueous solutions were not analyzed because they were too soft for uniaxial tensile testing. Instead, hydration of the samples after thermal post-curing resulted in specimens that were suitable for analysis, which displayed an average Young's modulus of 119±52 MPa and an average elongation at break of 40±8%.

TABLE 2

Results from tensile tests on dogbones of BSA with glycerol, BSA with glycerol after post-curing, and BSA after post-curing and hydration.

| | Young's modulus (MPa) | Ultimate strength (MPa) | Elongation at break (%) |
|---|---|---|---|
| BSA with glycerol after post-curing at 120° C. | 233 ± 9 | 8 ± 1 | 31 ± 6 |
| BSA after post-curing at 120° C. and hydration[a] | 119 ± 52 | 7 ± 2 | 40 ± 8 |
| BSA with glycerol without post-curing [b] | 79 ± 17 | 4 ± 0.3 | 66 ± 7 |

[a]BSA without post-curing was too weak to grip them for tensile testing. BSA after post-curing but without hydration was too brittle for tensile testing.
[b] BSA with glycerol (BSA printed in a vat of solution in water/glycerol mixture) was tough enough for tensile testing.

Encouraged by the general printability of aqueous BSA formulations, yet seeking improved mechanical properties, next, samples that were printed from water-glycerol mixtures were analyzed. Here, the glycerol can act as a plasticizer for the cured protein. It was found that dogbones of BSA printed with glycerol were suitable for mechanical analysis in their as-printed state and exhibited a Young's modulus of 79±17 MPa and up to 66±7% elongation at break. The elongation at break is a considerable improvement from the samples printed without glycerol. Thermal post-curing did have a significant impact on the tensile properties of the specimens printed with glycerol, as expected, and several comparisons can be made. Parts made from BSA with glycerol after post-curing at 120° C. exhibited an almost 4-fold greater Young's modulus (233±9 MPa) and 2-fold greater ultimate strength (8±1 MPa) than those without post-curing (79±17 MPa, 4±0.3 MPa, respectively). Thermal post-curing reduced the elongation at break by more than 2-fold, from 66±7% to 31±6%. The increased modulus and strength after post-curing likely results from an increased degree of crosslinking among protein chains, which would also be consistent with the reduced elongation at break. Dogbones of BSA with glycerol after thermal post-curing exhibited an almost 2-fold greater Young's modulus (233±9 MPa) compared to those without glycerol (119±52 MPa) and reached nearly the same elongation at break. In other words, the inclusion of glycerol can increase the tensile toughness of the parts. It is also noted that residual moisture content was largely consistent across all samples, regardless of thermal post-curing, and is therefore not likely the reason for the observed differences in mechanical properties.

To the inventors' knowledge there is no direct comparisons for 3D printed proteins absent any chemical modification, but similarities and differences may be made with 3D printed parts made from acroylated BSA. Specifically, increased elongation at break was reported after tannic acid treatment of 3D-printed parts made from methacroylated BSA and various comonomers. (P. T. Smith et al., *ACS Appl. Mater. Interfaces,* 2022, 14, 21418.) The comonomers included poly(ethylene glycol) diacrylate (5 wt %, 75% elongation from 3D printed parts), acrylamide (3 wt %, 67% elongation from 3D printed parts), and 2-hydroxylethyl acrylate (2 wt %, 94% elongation from 3D printed parts). The elongation at break (66±7%) of BSA printed via HAPPI AM with glycerol as disclosed herein is comparable with those from Smith et al. while also displaying 5- to 10-fold higher Young's modulus.

Figure 8:
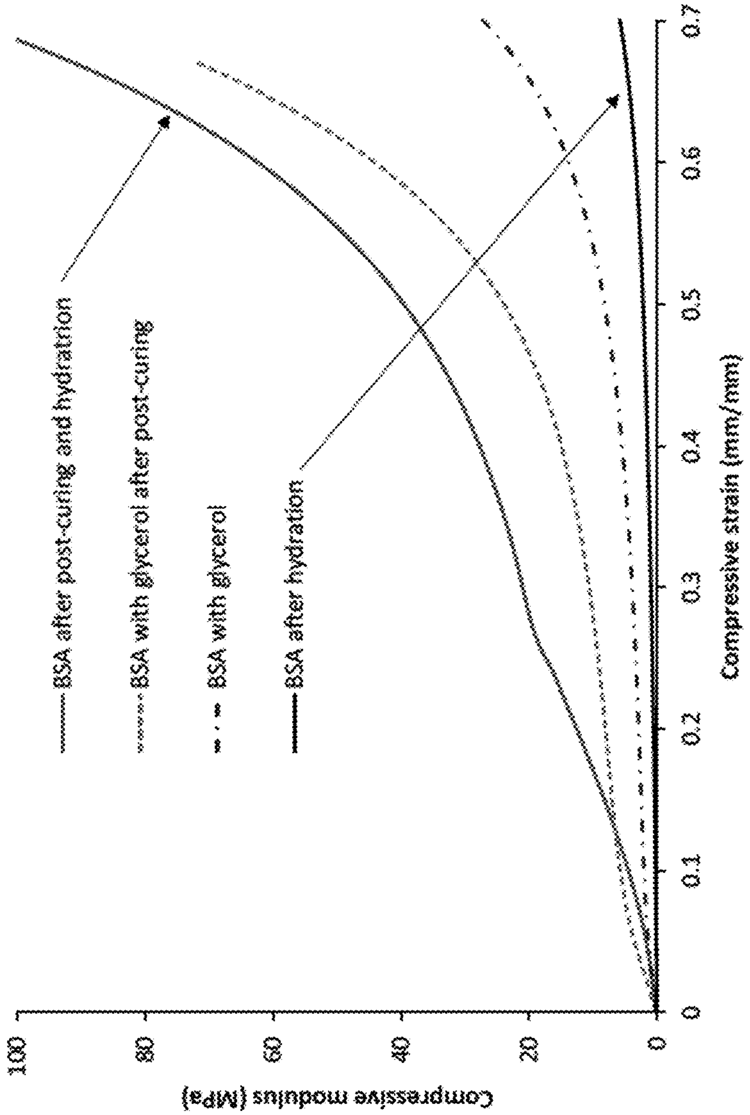
FIG. 8 plots results from compressive tests on printed cylinders of BSA with glycerol (dashed lines and dots), BSA with glycerol after post-curing (dashed lines), BSA after post-curing and hydration (solid, top), and BSA after hydration (solid, bottom).

The addition of glycerol and thermal post-curing steps also changed the mechanical behaviour under uniaxial compression (FIG. 8 and other data not shown). Here, the cylindrical geometry of the specimens as well as the nature of the uniaxial compression setup allowed for evaluation of BSA parts as-printed, without glycerol in the formulation. Overall, the effect of thermal post-curing was more significant in compressive properties than in tensile properties. Cylinders of BSA with glycerol showed a 10-fold greater compressive modulus (23±0.6 MPa) than BSA without glycerol (2.3±0.4 MPa). Post-curing increased the compressive modulus from 2.3±0.4 MPa to 62±9 MPa for BSA parts without glycerol, and from 23±0.6 MPa to 60±5 MPa for BSA parts with glycerol. Consistent with the tensile properties, increased modulus is attributed to increased degree of crosslinking after post-curing.

Figure 9:
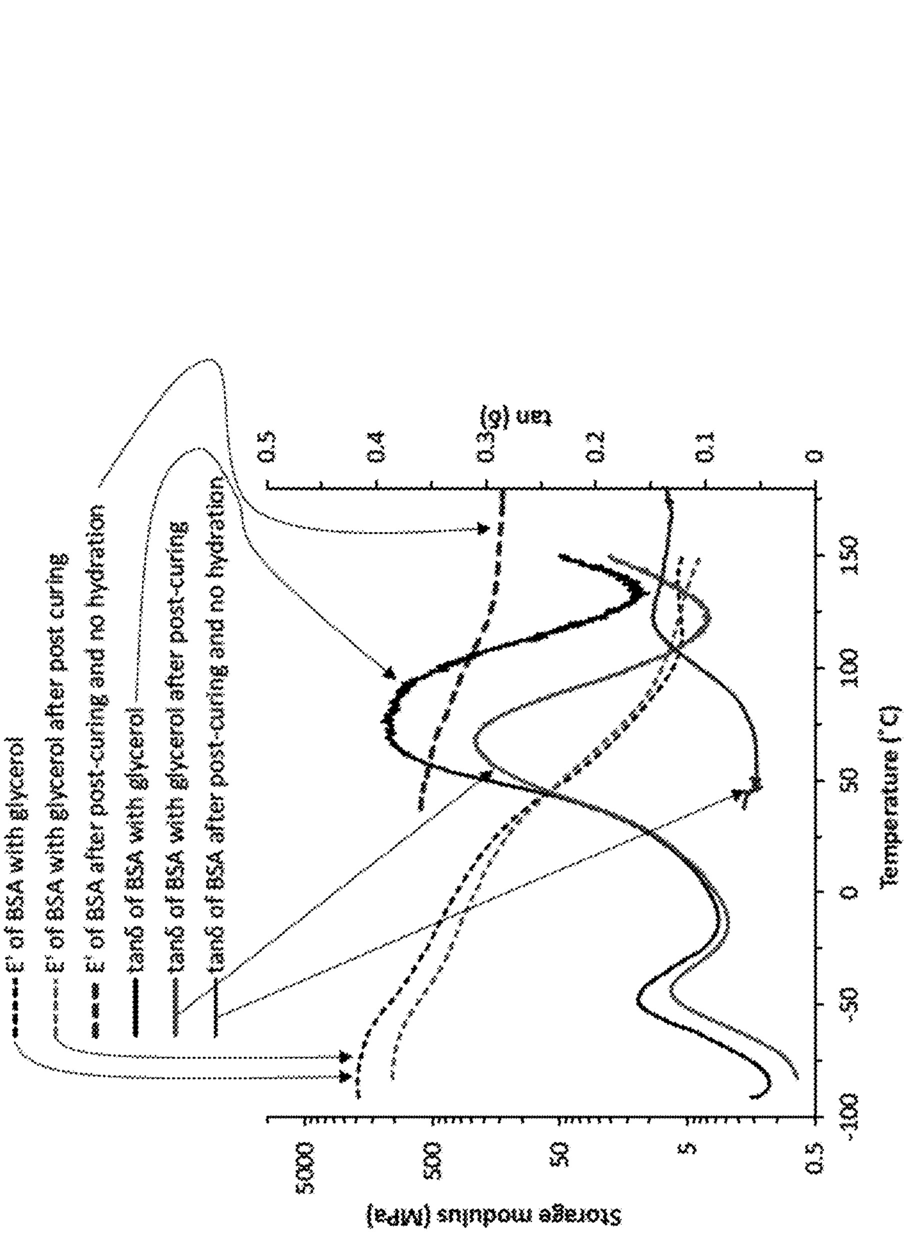
FIG. 9 plots dynamic mechanical analysis (DMA) results used to assess the storage modulus (E', dashed lines) and tan δ (solid lines) of BSA parts printed with glycerol, with and without thermal post-curing, and BSA parts with thermal post-curing and no hydration.

The molecular relaxations of printed BSA parts with glycerol, both with and without thermal post-curing as well as BSA parts from water with thermal post-curing but no hydration, were also examined as a function of temperature using DMA. FIG. 9 and other data not shown show two transitions in storage modulus and tan δ peaks at ca. −45 and 70° C. The lower temperature transition is attributed to secondary (or B) transitions induced by local motions including rotation of amino acid side groups linked to the main protein chain and internal motion within the side group. The higher temperature transition is ascribed to a glass transition induced by global motion of the main chain. The β transitions of proteins for extruded soy protein sheets has been reported to be from −33 to −72° C. and sunflower protein films from −35 to −52° C. depending upon moisture content. Since the moisture content was consistent across the present samples, differences in storage modulus at room temperature nor secondary transition temperatures were observed. Additionally, the storage modulus (E') of BSA after post-curing and no hydration at 40° C. was almost 7 times higher than that of BSA with glycerol. Additionally, the Tg of BSA with glycerol ranged from 70 to 80° C. whereas that of BSA after post-curing and no hydration was 123° C. The combined tensile testing, DMA, and compression testing data indicate an ability to greatly modulate the mechanical behaviour of protein-based 3D printed parts.

The crosslinking density ($\nu_e$) of printed BSA with and without glycerol by DMA were studied. The $\nu_e$ value is calculated from equation, $\nu_e = E'_{rubbery}/(3RT)$, where $E'_{rubbery}$ is the storage modulus in the rubbery plateau regime (50 K above the Tg value at the tan δ peak), R is the universal constant and T is absolute temperature. The $\nu_e$ of BSA samples with glycerol was found to be 0.58 kmol/m$^3$ without post-curing and 0.61 kmol/m$^3$ with post-curing. The $\nu_e$ of BSA samples with post-curing and no hydration was found to be 14.4 kmol/m$^3$, which is almost 24 times greater than with glycerol. These results show significant effects of plasticizers, such as glycerol, on calculated $\nu_e$ values as well as mechanical properties.

Aging Studies

Figure 10:
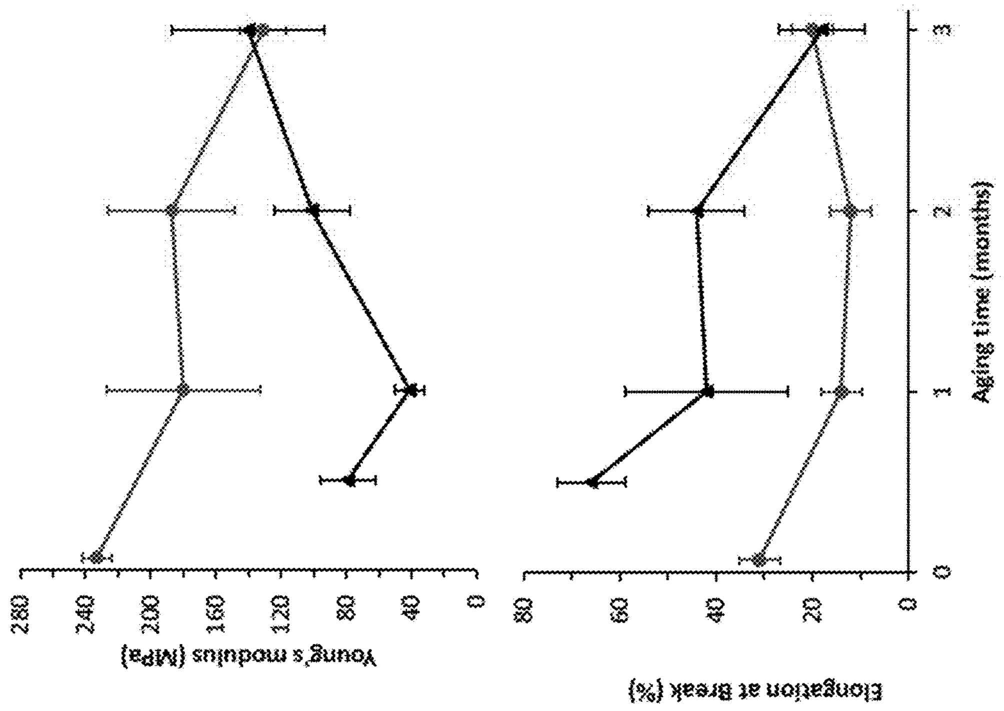
FIG. 10 shows comparison plots of Young's modulus (top) and elongation at break (bottom) of printed dogbones of BSA with glycerol for samples with (solid circles) and without (solid triangles) post-curing. Lines are for visual aid only. Values represent an average of three experiments, error bars=1 standard deviation.

It was observed that addition of glycerol increased elongation at break while maintaining comparable Young's modulus and ultimate strength of the bioplastics after post-curing to those without adding glycerol. It would be meaningful to study how the mechanical properties of BSA with glycerol change over time since glycerol is not covalently bonded to BSA, and therefore could slowly evaporate over time. Accordingly, the impact of aging on the mechanical properties of dogbones produced from BSA with glycerol was studied. Tensile test results of BSA with glycerol were conducted on two sets of specimens, one that did not undergo thermal post-curing and one that was post-cured at 120° C. Samples were removed at 1-month intervals for 3 months (FIG. 10 and other data not shown). Gradual changes in both the Young's modulus and elongation at break were observed for each sample type, regardless of thermal post-curing. Without post-curing, increases in Young's modulus from 79±17 MPa to 140±47 MPa and decreases in elongation at break from 66±7% to 18±9% over the course of 3 months were observed. With thermal post-curing, aging resulted in deceased Young's modulus from 233±9 MPa to 131±14 MPa, and decreased elongation at break from 31±6% to 20±9%. Across all samples, the moisture content remained fairly consistent, between 10 to 13%, for the duration of the aging study (data not shown). It is noted that the Young's modulus, ultimate strength, and elongation at break within each type of sample set became similar in value after 3 months (FIG. 10 and other data not shown).

Biodegradation of BSA in Pepsin Solution

Figure 11:
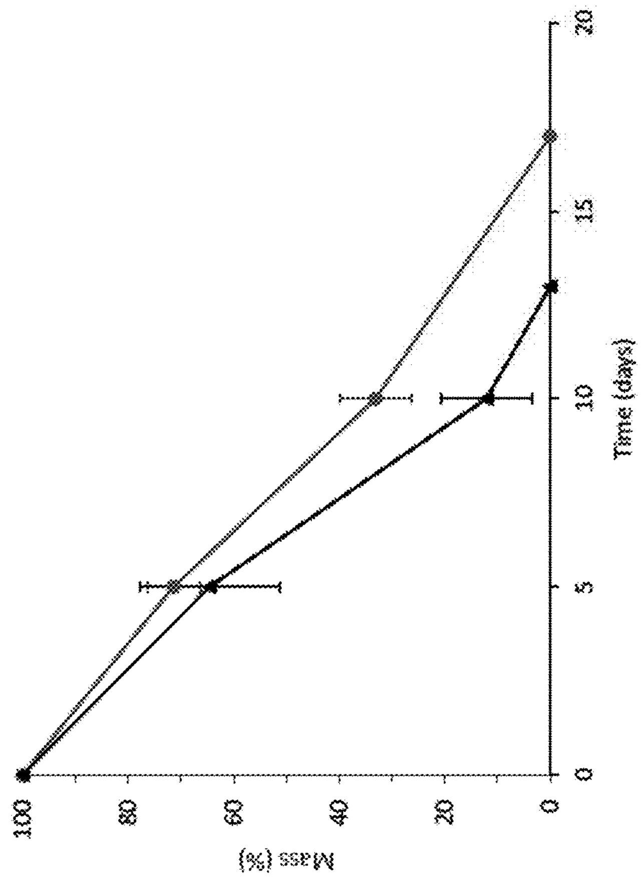
FIG. 11 plots degradation profiles of printed BSA cylinders with (solid circles) and without (solid triangles) thermal post-curing at 120° C. Samples were prepared in pepsin solution, which was refreshed every other day. Mass % refers to the residual mass of solids as determined gravimetrically.

Among the benefits of using proteins without chemical modifications as build materials is their propensity for full biodegradation at the part's end of life. To investigate, sample discs were prepared (three groups of four discs: diameter=16±0.4 mm, height=5.3±0.2 mm, 0.89±0.01 g, 0.94±0.005 g and 0.96±0.008 g after drying) and half were subjected to thermal post-curing at 120° C., and their biodegradation in pepsin solution (pH 1.5-2.0) at 37° C. (FIG. 11 and other data not shown) was examined. The extent of biodegradation was determined gravimetrically, and it was noted that throughout the process there were small components of the sample specimen that broke free from the main part. It was found that post-curing increased the time required to completely consume the discs, which had no visually observable solids by day 17. In contrast, samples that were not thermally post-cured achieved full consumption of solids within 13 days. The results suggest that unmodified proteins degrade faster and more completely than chemically modified proteins. For example, reported biodegradation studies on 3D printed parts made from acroylated BSA, along with either poly(ethylene glycol) diacrylate (5 wt %) or acrylamide (3 wt %), showed ca. 61% degradation within 30 days. (P. T. Smith et al.) The fast and complete degradation of the present HAPPI AMPD samples is attributed, at least in part, to the absence of any comonomers or chemical modifications. Combining custom pars generated by HAPPI AMPD with full biodegradation enables a circular economy of build materials.

AMPD Using Photothermal Particles in the Formulation

As a demonstration of the generalizable nature of AMPD, photothermal dyes in the resin solution were used instead of a photothermal plate. The BSA solutions were mixed with bromothymol blue sodium salts ($\lambda_{max}$ at 392 and 615 nm, data from commercial supplier) and AMPD using DLP with a white light projector was carried out. Separately, IR-806 dye ($\lambda_{max}$ at 806 nm, data from commercial supplier) was incorporated for AMPD using a diode laser of 808 nm. It was found that each setup was effective in achieving AMPD (FIG. 12) with subjectively better surface finish and roughness as compared to the DLP-based approach. The results show that whether by laser rastering or DLP projection, AMPD can be implemented with common vat photopolymerization platforms having optically transparent vat bottoms, rather than photothermal plates used in HAPPI AM.

CONCLUSIONS

This Example reports a new approach to AM that leverages protein denaturation and aggregation as the mechanism by which aqueous formulations are converted into solid parts. Two different AM techniques that enable patterning of heat via photothermal transduction were used in combination with BSA and EWPs to produce complex 3D structures, including gyroids with open voids and overhangs. Notably, the formulations have simple compositions, containing 25-35 wt % of protein in water, and the proteins do not require any chemical modifications to be printable into bioplastic parts. The mechanical properties of the printed products were tunable by post-curing and through the incorporation of a biodegradable plasticizer. Mechanical analyses revealed a Young's modulus up to 0.2 GPa, which is in the range of low-density polyethylene, and an elongation at break up to 70%, which is comparable to tannic acid-treated BSA. The printed bioplastics showed good enzymatic biodegradability and reached full degradation within 17 days. The results support the use of the technology for a variety of applications including food products, nutritional supplements, packaging materials, and sustainable structural engineering materials. AMPD can be applied to other proteins, including plant-based variants, enabling manufacturing of bioplastics with tunable mechanical properties from diverse sources.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the disclosure in various embodiments and with various modifications as suited to the particular use contemplated. It is intended that the scope of the disclosure be defined by the claims appended hereto and their equivalents.

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The term "consisting" may be used in place of any instance of the term "comprising" in the present disclosure.

What is claimed is:

1. A method for additive manufacturing of an object, the method comprising: (a) providing a build solution comprising proteins and a solvent in an additive manufacturing system, wherein the build solution is free of solid particles; (b) generating heat in the build solution to denature proteins; and (c) aggregating denatured proteins to form a solidified region of an object, the solidified region comprising denatured, aggregated proteins, wherein in step (b), the heat is generated in a localized area of the build solution to denature proteins in the localized area, wherein the localized area is in contact with unheated build solution, and in step (c), the solidified region is formed in the localized area of the build solution, and further wherein the build solution does not comprise a compound comprising a polymerizable chemical moiety.

2. The method of claim 1, further comprising repeating steps (b) and (c) one or more additional times to form one or more additional solidified regions.

3. The method of claim 1, wherein step (b) is carried out by contacting a thermally conductive material in contact with the build solution to a movable inductive heater.

4. The method of claim 1, wherein step (b) achieves a temperature in a range of from 60° C. to 200° C. in the localized area.

5. The method of claim 1, wherein a polymerization reaction does not occur in the build solution to form the solidified region.

6. The method of claim 1, wherein the proteins are native proteins.

7. The method of claim 1, wherein the proteins exhibit a first endothermic transition at a temperature that is at, or below, a temperature attained by the heat generated in the localized area.

8. The method of claim 1, wherein the proteins are present in the build solution at an amount that is below a saturation limit of the proteins in the build solution at room temperature.

9. The method of claim 1, wherein the build solution consists of the protein, the solvent, and optionally, one or more of a pH agent, a buffer, a reducing agent, and glycerol.

10. The method of claim 1, wherein the heat is patterned or scanned and steps (b) and (c) form a layer comprising a plurality of solidified regions, wherein the solidified region is one of the plurality of solidified regions.

11. The method of claim 10, further comprising repeating steps (b) and (c) one or more additional times to form one or more additional layers.

12. The method of claim 1, wherein step (b) is carried out by illuminating a photothermal material in contact with the build solution with light.

13. The method of claim 12, wherein the photothermal material is provided in a photothermal base mounted within the additive manufacturing system to form an interface with the build solution and to receive the light.

14. The method of claim 1, wherein the proteins are present in the build solution at an amount in a range of from 0.5 weight % to 40 weight %.

15. The method of claim 14, wherein the amount is in a range of from 20 weight % to 40 weight %.

* * * * *